United States Patent
Tsao et al.

(10) Patent No.: US 7,437,224 B2
(45) Date of Patent: Oct. 14, 2008

(54) TARGET ACQUISITION CONTROL FOR SPACECRAFT GIMBALLED PAYLOAD

(75) Inventors: Tung-Ching Tsao, Torrance, CA (US); Ketao Liu, Cerritos, CA (US)

(73) Assignee: The Boeing Company, Chicago, IL (US)

( * ) Notice: Subject to any disclaimer, the term of this patent is extended or adjusted under 35 U.S.C. 154(b) by 381 days.

(21) Appl. No.: 10/951,670

(22) Filed: Sep. 28, 2004

(65) Prior Publication Data

US 2006/0065788 A1 Mar. 30, 2006

(51) Int. Cl.
*G06F 17/00* (2006.01)
(52) U.S. Cl. .................. 701/13; 244/171; 244/158.1; 244/173.1; 74/5.47
(58) Field of Classification Search .......... 701/13; 244/171, 164, 158.1, 173.1, 173.3, 169; 74/5.47; B06F 17/00; B64G 1/36
See application file for complete search history.

(56) References Cited

U.S. PATENT DOCUMENTS

| | | | | |
|---|---|---|---|---|
| 4,949,922 A | * | 8/1990 | Rosen | 244/168 |
| 5,557,285 A | * | 9/1996 | Bender et al. | 342/359 |
| 5,906,339 A | * | 5/1999 | Basuthakur et al. | 244/166 |
| 6,003,817 A | * | 12/1999 | Basuthakur et al. | 244/164 |
| 6,059,234 A | * | 5/2000 | Mueller et al. | 244/173.1 |
| 6,102,237 A | * | 8/2000 | Nguyen et al. | 220/276 |
| 6,102,337 A | * | 8/2000 | Quartararo | 244/169 |
| 6,102,339 A | * | 8/2000 | Wu et al. | 244/171.8 |
| 6,154,691 A | * | 11/2000 | Bailey | 701/13 |
| 6,441,776 B1 | * | 8/2002 | Hein et al. | 342/357.06 |
| 6,484,973 B1 | * | 11/2002 | Scott | 244/172.5 |
| 6,609,037 B1 | * | 8/2003 | Bless et al. | 700/45 |
| 6,681,649 B2 | * | 1/2004 | Hyde et al. | 74/5.47 |
| 6,779,759 B1 | * | 8/2004 | Klupar et al. | 244/165 |
| 7,028,953 B2 | * | 4/2006 | Sebata et al. | 244/171.8 |

OTHER PUBLICATIONS

Yuan-Hsi Cheng; Hung, J.C., On the control of the inertial platform for a satellite launch vehicle having large attitude angles, May 20-24, 1991 pp. 390-393 vol. 1.*

* cited by examiner

*Primary Examiner*—Tuan C To
(74) *Attorney, Agent, or Firm*—Gates & Cooper LLP

(57) ABSTRACT

A method and apparatus for controlling a gimbaled platform (108). The method comprises the steps of computing an acquisition phase gimbal angle rate command $\omega_{cmd\_Acq}$ (530) from a measured LOS angle error $\Delta\theta_{LOS}$ (520) for an initial control period T while computing an estimated LOS angle rate $\hat{\omega}_{LOS}$ (524), computing a tracking phase gimbal angle rate command $\omega_{cmd\_Trk}$ (532) using a controller (512) having an output initialized with the estimated LOS angle rate $\hat{\omega}_{LOS}$ (524), and commanding the gimballed platform (108) according to an angle rate command $\omega_{cmd}$ (522), wherein the angle rate command $\omega_{cmd}$ (522) is the acquisition phase angle rate command $\omega_{cmd\_Acq}$ (530) during the initial control period T and the tracking phase gimbal angle rate command $\omega_{cmd\_Trk}$ (532) after the initial control period T.

54 Claims, 8 Drawing Sheets

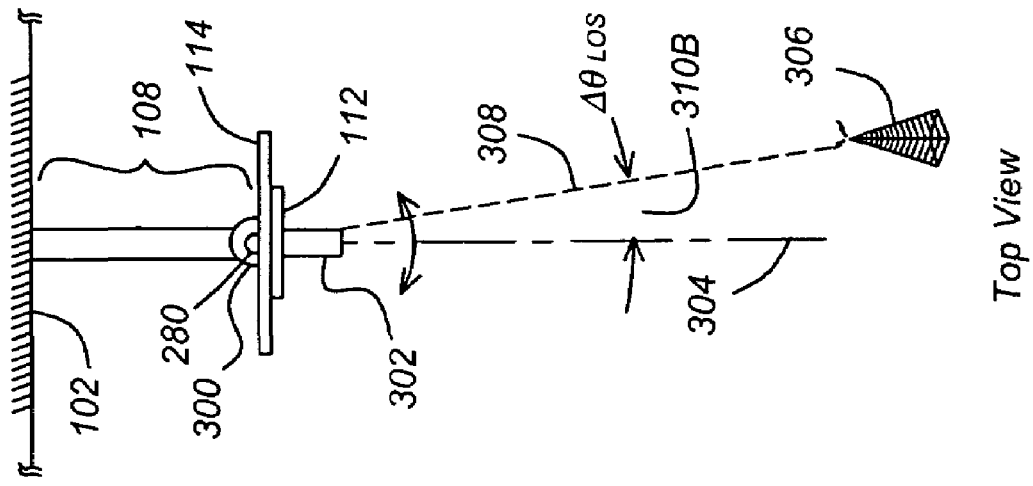
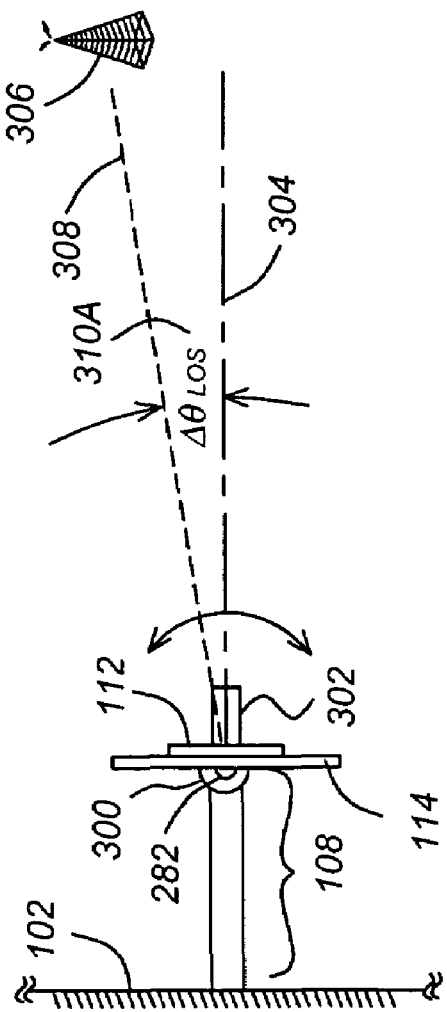
*FIG. 3B*  Top View
*FIG. 3A*  Side View

TARGET ACQUISITION CONTROL FOR SPACECRAFT GIMBALLED PAYLOAD

STATEMENT OF RIGHTS OWNED

This invention was made with Government support under contract number F04701-99-C-0027 awarded by the U.S. Air Force. The Government has certain rights in this invention.

BACKGROUND OF THE INVENTION

1. Field of the Invention

The present invention relates to systems and methods for controlling spacecraft payloads, and in particular to a method and apparatus for controlling a spacecraft gimballed payload.

2. Description of the Related Art

Spacecraft such as satellites often include payloads such as antennas and sensors. Often, such payloads are disposed on gimballed platforms, which help isolate the payload from spacecraft motion, and allow the payload to be pointed to space or terrestrially-based targets as desired.

Target acquisition control is a procedure wherein the gimballed platform is oriented so that the payload is directed to point sufficiently close to the inertial payload-target line of sight (LOS) angle to permit acquisition and subsequent tracking of the target, either by the payload itself or by an acquisition and/or tracking sensor accompanying the payload and typically mounted on the gimbal. Examples of gimballed payloads include RF crosslink antennas for communicating with other spacecraft and optical laser devices. Examples of acquisition sensors include autotrack receivers, beacon trackers, and optical devices.

Acquisition control can be a challenging task, particularly when the spacecraft and/or the target are in motion. It is also important that the time to acquire and track the target (the acquisition time) be minimized. In commercial communications systems, acquisition time is "down time" in the sense that the payload cannot perform its mission until the target is acquired, and longer acquisition times mean shorter service times. For defense applications, the acquisition time is even more critical, as excessive acquisition times can result in mission failure.

What is needed is a system and method for increasing target acquisition probabilities while minimizing acquisition time. The present invention satisfies that need.

SUMMARY OF THE INVENTION

To address the requirements described above, the present invention discloses a method and apparatus for controlling a gimbaled platform. The method comprises the steps of computing an acquisition phase gimbal angle rate command $\omega_{cmd\_Acq}$ from a measured LOS angle error $\Delta\theta_{LOS}$ for an initial control period T; computing an estimated LOS angle rate $\hat{\omega}_{LOS}$; computing a tracking phase gimbal angle rate command $\omega_{cmd\_Trk}$ using a controller having at least one state variable initialized with the estimated LOS angle rate $\hat{\omega}_{LOS}$; and commanding the gimballed platform according to an angle rate command $\omega_{cmd}$, wherein the angle rate command $\omega_{cmd}$ is the acquisition phase angle rate command $\omega_{cmd\_Acq}$ during the initial control period T and the tracking phase gimbal angle rate command $\omega_{cmd\_Trk}$ after the initial control period T.

In one embodiment, the apparatus comprises a sensor, for measuring a LOS angle error $\Delta\theta_{LOS}$ and a controller, communicatively coupled to the sensor, the controller for commanding the gimballed platform. The controller may comprise an acquisition controller, for computing an acquisition phase gimbal angle rate command $\omega_{cmd\_Acq}$ from a measured LOS angle error $\Delta\theta_{LOS}$ for an initial control period T; an estimator, for computing an estimated LOS angle rate $\hat{\omega}_{LOS}$; a tracking controller, for computing a tracking phase gimbal angle rate command $\omega_{cmd\_Trk}$ using a controller having at least one state variable initialized with the estimated LOS angle rate $\hat{\omega}_{LOS}$; and a switch, for applying the acquisition phase gimbal angle rate command $\omega_{cmd\_Acq}$ to a gimbal drive during the initial control period T and applying the tracking phase gimbal rate command $\omega_{cmd\_Trk}$ after the initial control period T.

BRIEF DESCRIPTION OF THE DRAWINGS

Referring now to the drawings in which like reference numbers represent corresponding parts throughout:

FIGS. 3A and 3B are diagrams showing a side and top view of the gimbal assembly, platform, and payload;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
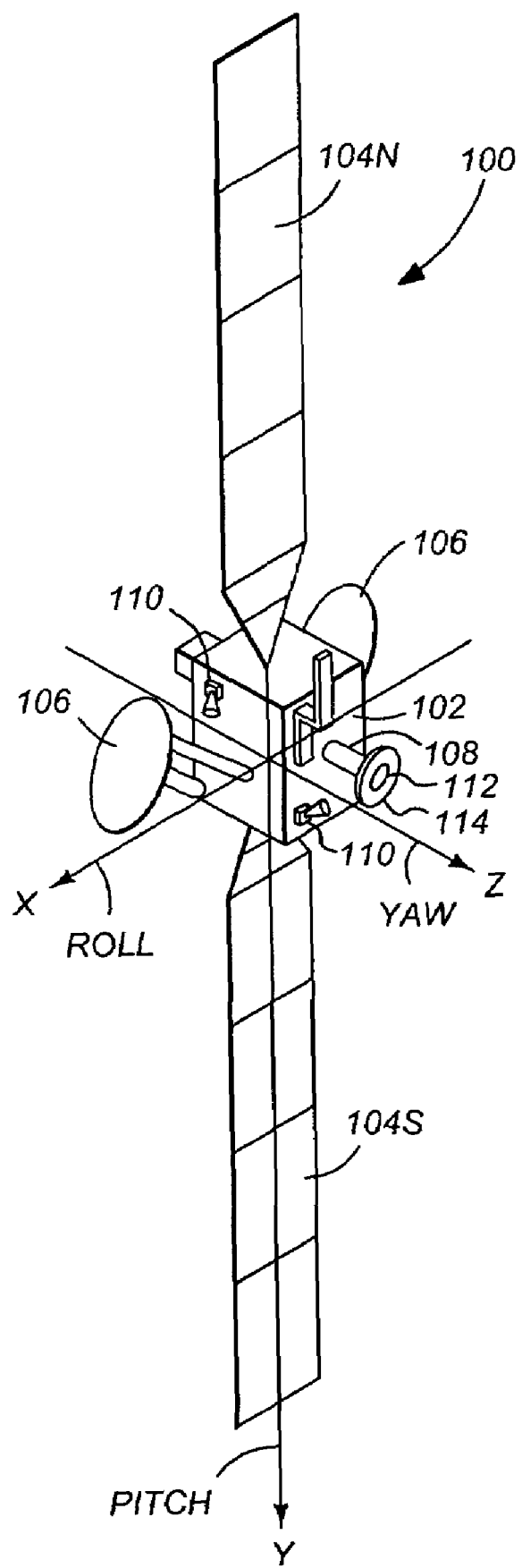
FIG. 1 is a block diagram showing an exemplary spacecraft 100.

FIG. 1 illustrates a three-axis stabilized satellite or spacecraft 100. The satellite 100 has a main body 102, a pair of solar panels 104, and a pair of high gain narrow beam antennas 106. The satellite 100 also comprises a payload 112 mounted on platform 114, which is mounted on a gimbal assembly 108, allowing the payload 112 to be angularly directed in a desired direction. Typically, the gimbal assembly 108 allows motion of the payload 112 in elevation and azimuth. The payload can be any payload that must be pointed in a precise direction, for example, an antenna 112 which is aimed at a control ground station, or is aimed at a cross-link antenna on another spacecraft.

The satellite 100 may also include one or more sensors 110 to measure the attitude of the satellite 100. These sensors may include sun sensors, earth sensors, and star sensors. Since the solar panels are often referred to by the designations "North"

and "South", the solar panels in FIG. 1 are referred to by the numerals 104N and 104S for the "North" and "South" solar panels, respectively.

The three axes of the spacecraft 100 are shown in FIG. 1. The pitch axis P lies along the plane of the solar panels 140N and 140S. The roll axis R and yaw axis Y are perpendicular to the pitch axis P and lie in the directions and planes shown. The antenna 112 points to the Earth along the yaw axis Z.

Figure 2:
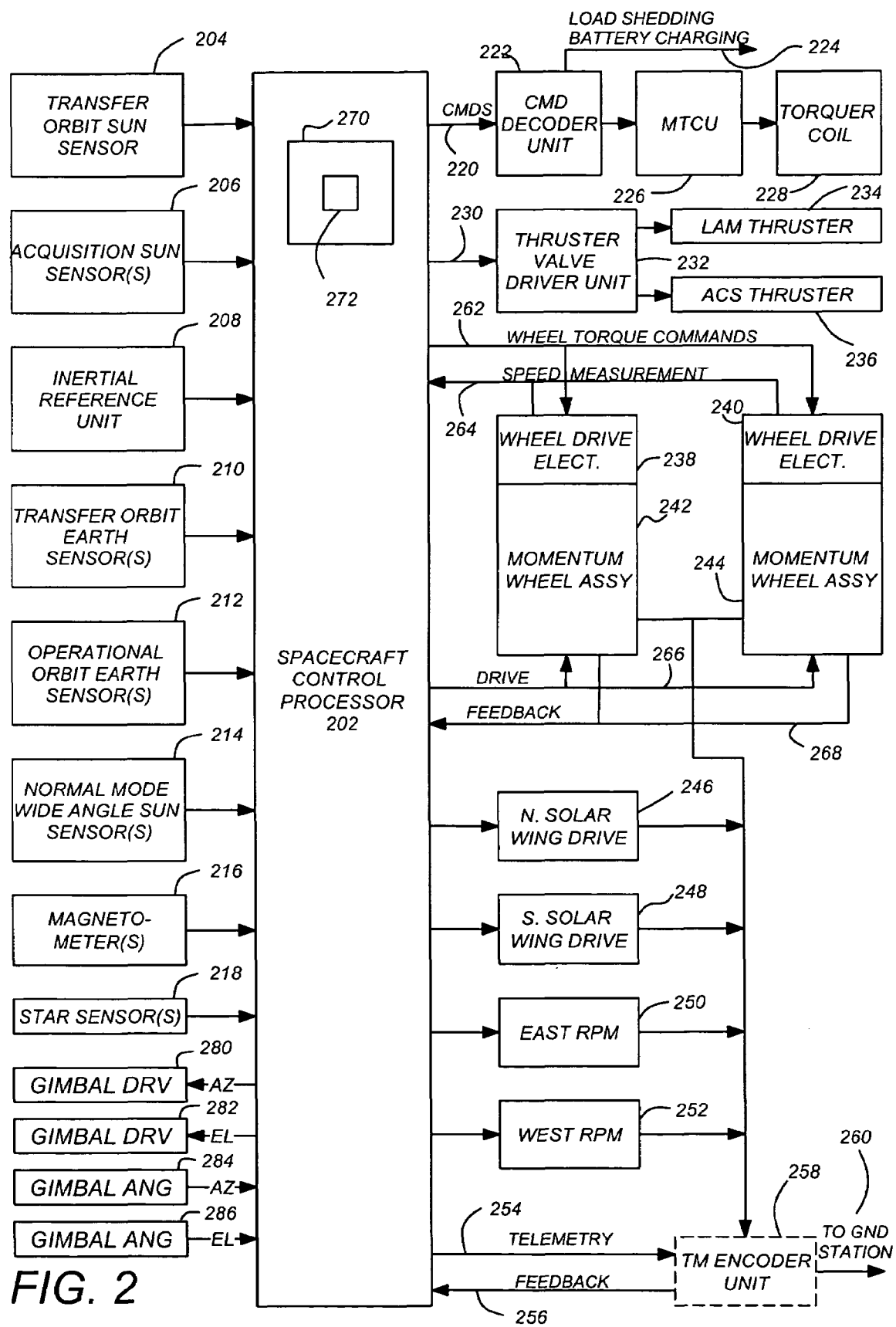
FIG. 2 is a diagram depicting a the functional architecture of a satellite control system.

FIG. 2 is a diagram depicting the functional architecture of a representative attitude control system. Control of the spacecraft is provided by a computer or spacecraft control processor (SCP) 202. The SCP performs a number of functions which may include post ejection sequencing, transfer orbit processing, acquisition control, station keeping control, normal mode control, mechanisms control, fault protection, and spacecraft systems support, among others. The post ejection sequencing could include initializing to ascent mode and thruster active nutation control (TANC). The transfer orbit processing could include attitude data processing, thruster pulse firing, perigee assist maneuvers, and liquid apogee motor (LAM) thruster firing. The acquisition control could include idle mode sequencing, sun search/acquisition, and Earth search/acquisition. The station keeping control could include auto mode sequencing, gyro calibration, station keeping attitude control and transition to normal. The normal mode control could include attitude estimation, attitude and solar array steering, momentum bias control, magnetic torqueing, and thruster momentum dumping (H-dumping). The mechanism control could include solar panel control and reflector positioning control. The spacecraft control systems support could include tracking and command processing, battery charge management and pressure transducer processing.

Input to the spacecraft control processor 202 may come from any combination of a number of spacecraft components and subsystems, such as a transfer orbit sun sensor 204, an acquisition sun sensor 206, an inertial reference unit 208, a transfer orbit Earth sensor 210, an operational orbit Earth sensor 212, a normal mode wide angle sun sensor 214, a magnetometer 216, and one or more star sensors 218.

The SCP 202 generates control signal commands 220, which are directed to a command decoder unit 222. The command decoder unit operates the load shedding and battery charging systems 224. The command decoder unit also sends signals to the magnetic torque control unit (MTCU) 226 and the torque coil 228.

The SCP 202 also sends control commands 230 to the thruster valve driver unit 232 which in turn controls the liquid apogee motor (LAM) thrusters 234 and the attitude control thrusters 236.

Wheel speed commands 262 are generated by the SCP 202 and are communicated to the wheel speed electronics 238 and 240. These effect changes in the wheel speeds for wheels in reaction wheel assemblies 242 and 244, respectively. The speed of the wheels is also measured and fed back to the SCP 202 by feedback control signal 264.

The spacecraft control processor also sends command signals 254 to the telemetry encoder unit 258 which, in turn, sends feedback signals 256 to the SCP 202. This feedback loop, as with the other feedback loops to the SCP 202 described earlier, assist in the overall control of the spacecraft. The SCP 202 communicates with the telemetry encoder unit 258, which receives the signals from various spacecraft components and subsystems indicating current operating conditions, and then relays them to the ground station 260.

The SCP 202 may include or have access to memory 270, such as a random access memory (RAM). Generally, the SCP 202 operates under control of an operating system 272 stored in the memory 270, and interfaces with the other system components to accept inputs and generate outputs, including commands. Applications running in the SCP 202 access and manipulate data stored in the memory 270. The spacecraft 100 may also comprise an external communication device such as a satellite link for communicating with other computers at, for example, a ground station. If necessary, operation instructions for new applications can be uploaded from ground stations.

The SCP 202 also compute and provide an azimuth gimbal drive signal to an azimuth channel gimbal driver 280, and an elevation gimbal drive signal to an elevation channel gimbal driver 282. Gimbal angular position information may be provided to the SCP 202 from azimuth gimbal angular sensor 284 and elevation gimbal angular sensor 286.

In one embodiment, instructions implementing the operating system 272, application programs, and other modules are tangibly embodied in a computer-readable medium, e.g., data storage device, which could include a RAM, EEPROM, or other memory device. Further, the operating system 272 and the computer program are comprised of instructions which, when read and executed by the SCP 202, causes the spacecraft processor 202 to perform the steps necessary to implement and/or use the present invention. Computer program and/or operating instructions may also be tangibly embodied in memory 270 and/or data communications devices (e.g. other devices in the spacecraft 100 or on the ground), thereby making a computer program product or article of manufacture according to the invention. As such, the terms "program storage device," "article of manufacture" and "computer program product" as used herein are intended to encompass a computer program accessible from any computer readable device or media.

FIGS. 3A and 3B are diagrams showing a side and top view of the gimbal assembly 108, platform 114 and payload 112, respectively.

FIG. 3A illustrates an embodiment in which the gimbal assembly 108 is mounted to the satellite main body 102 and includes a gimbal driver 282. The gimbal driver 282 angularly drives the gimbal 300 and the platform 114 in a first (e.g. elevation) direction as indicated.

The gimbal assembly 108 also comprises a sensor 302. The sensor 302 is physically coupled to the payload 112 or the platform 114 so that angular motion of the payload 112 causes substantially the same angular motion in the sensor 302. In the illustrated embodiment, the sensor 302 is an acquisition and tracking sensor, which is mounted at the center of the payload 112. However, the acquisition and tracking sensor 302 may be mounted on a side periphery of the payload 112, or to the platform 114 and not the payload 112 as well. In such cases, differences between the payload 112 coordinate frame and the sensor 302 coordinate frame may be ignored, or accounted for with appropriate coordinate transformations. In one embodiment, the acquisition and tracking sensor 302 provides a signal proportional to the angular error $\Delta\theta_{LOS}$ 310 between the a sensor boresight 304 and a target 306 sensed by the sensor 302. In the illustrated embodiment of FIG. 3A, the angular error $\Delta\theta_{LOS}$ 310 is an elevation angle angular error $\Delta\theta_{el,LOS}$ 310A.

FIG. 3B is a top view of the embodiment shown in FIG. 3A, showing a second gimbal driver 280 that angularly drives the gimbal 300 in a second (e.g. azimuth) direction as shown. In this embodiment, the angular error $\Delta\theta_{LOS}$ 310 is an azimuth angle angular error $\Delta\theta_{az,LOS}$ 310B.

Figure 4:
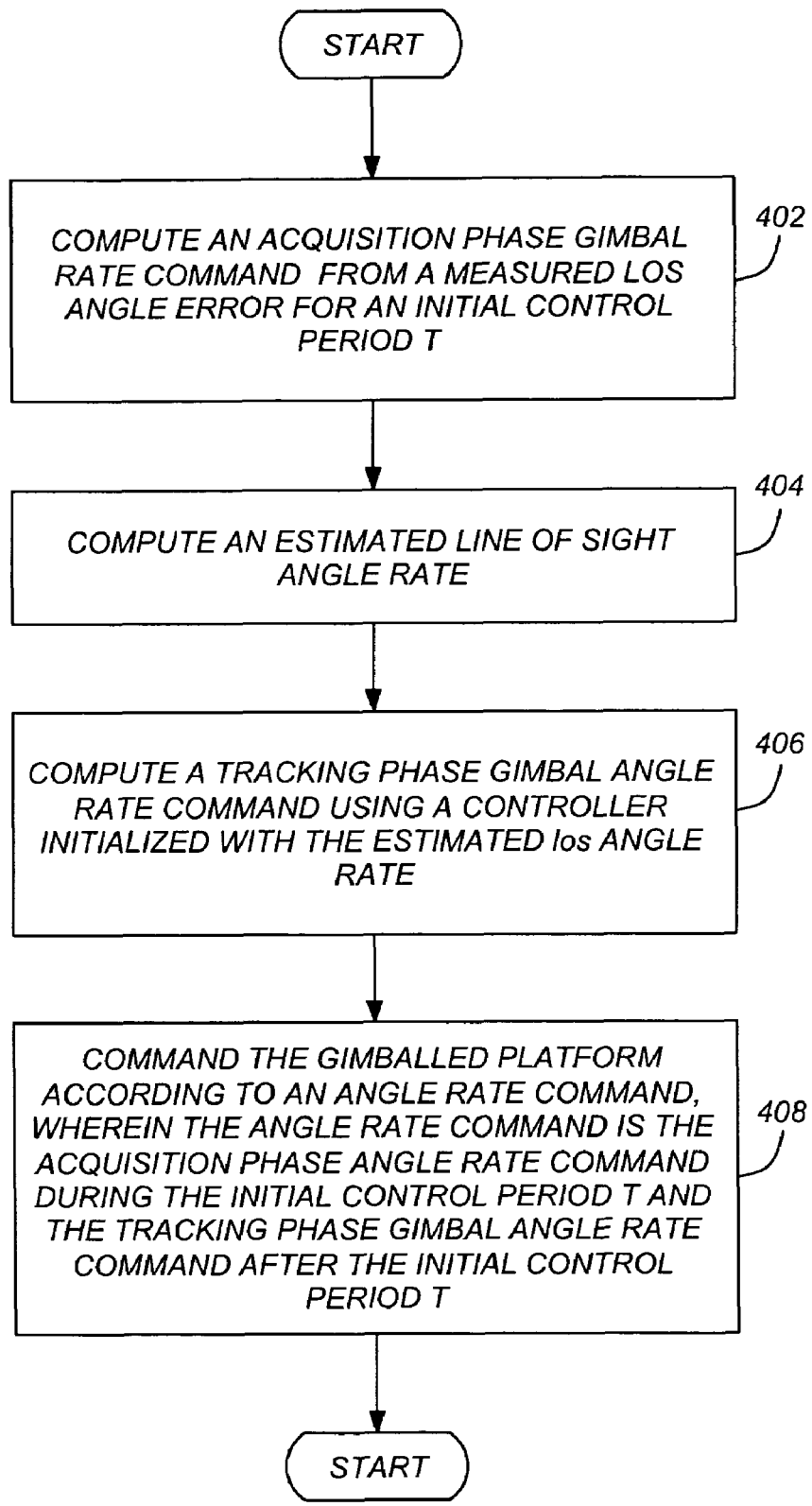
FIG. 4 is a flow chart illustrating exemplary process steps that can be used to practice one embodiment of the present invention.

FIG. 4 is a flow chart illustrating exemplary process steps that can be used to practice one embodiment of the present invention. In block 402, an acquisition phase gimbal rate command $\omega_{cmd\_Acq}$ (which may be expressed as a command for the azimuth and elevation channels, e.g. $\omega_{az,cmd\_Acq}$ and $\omega_{el,cmd\_Acq}$, respectively) is computed from a measured LOS angle error $\Delta\theta_{LOS}$ for an initial control period T. In one embodiment, the initial control period T ends when the measured LOS angle error $\Delta\theta_{LOS}$ is below a threshold value $\Delta\theta_{LOS_{thresh}}$ for a number N (typically, 2, 3, or 4) of consecutive LOS angle error $\Delta\theta_{LOS}$ measurements.

In block 404, an estimated LOS angle rate $\hat{\omega}_{LOS}$ is computed. In one embodiment, the LOS angle rate estimate $\hat{\omega}_{LOS}$ is computed when or shortly after the control period T ends. In another embodiment, the estimated LOS angle rate $\hat{\omega}_{LOS}$ is computed during the initial control period, but not provided to the linear controller (described below) until the control period ends. In an embodiment described further below, the estimated LOS angle rate $\hat{\omega}_{LOS}$ is computed from data matrices or equations that are populated during the initial control period T but the computation of the estimated LOS angle rate $\hat{\omega}_{LOS}$ does not occur until after the initial control period T ends. This permits the computation of the estimated LOS angle rate $\hat{\omega}_{LOS}$ to be performed expeditiously.

Block 406 computes a tracking phase gimbal angle rate command $\omega_{cmd\_Trk}$ using a controller initialized with the estimated LOS angle rate $\hat{\omega}_{LOS}$ at the time when the initial period T ends. Finally, in block 408, the gimballed platform controls are commanded according to an angle rate command $\omega_{Cmd}$, wherein the angle rate command $\omega_{Cmd}$ is the acquisition phase angle rate command $\omega_{cmd\_Acq}$ during the initial control period T and the tracking phase gimbal angle rate command $\omega_{cmd\_Trk}$ after the initial control period T.

Figure 5:
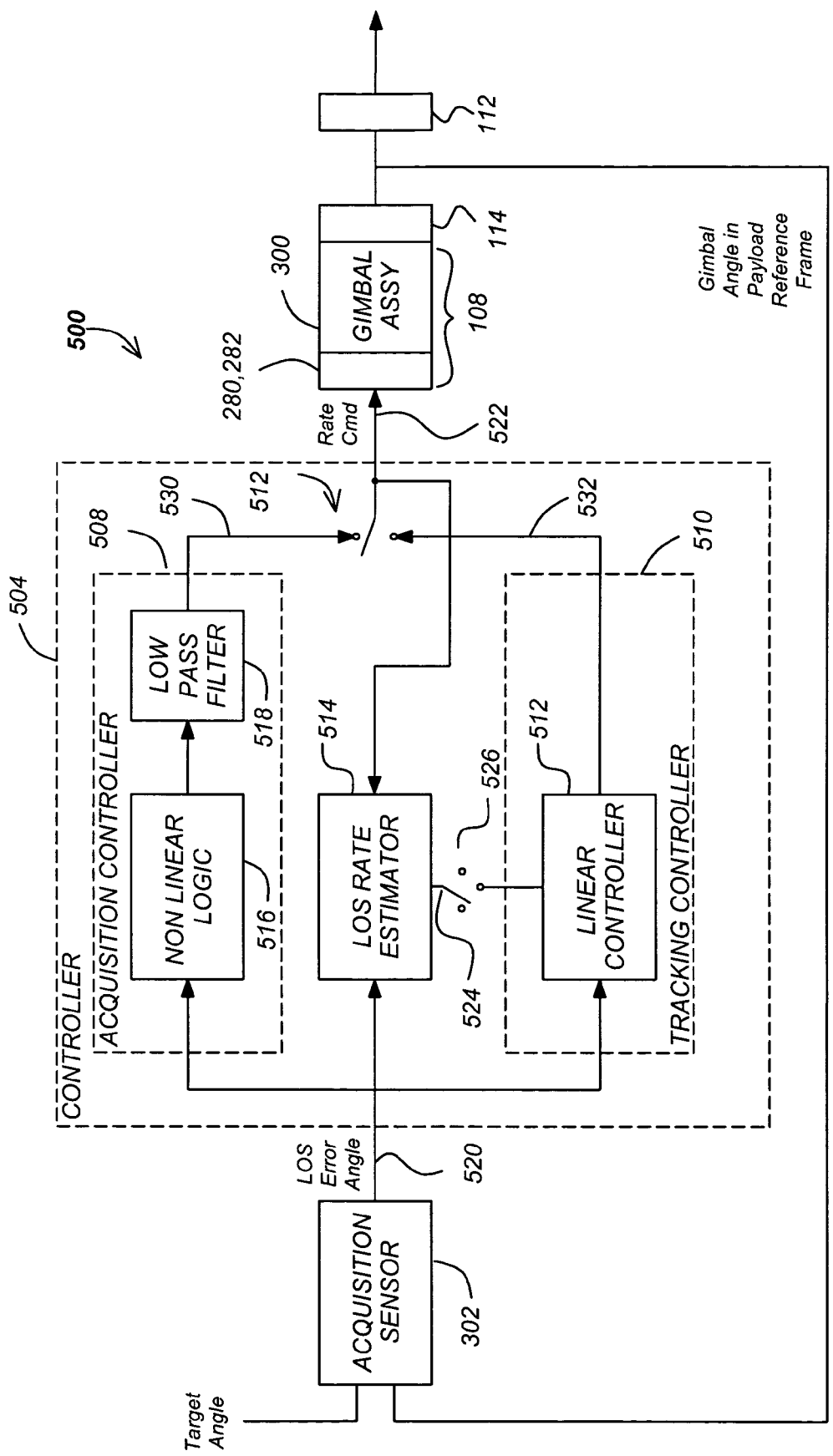
FIG. 5 is a diagram showing an exemplary embodiment of one channel of a system for performing the operations shown in FIG. 4.

FIG. 5 is a diagram showing an exemplary embodiment of a one channel (e.g. azimuth or elevation) of a system for performing the operations shown in FIG. 4. A controller 504 is communicatively coupled to the acquisition sensor 302 and the gimbal assembly 108. The controller 504 accepts measured LOS angle errors $\Delta\theta_{LOS}$ 520 from the acquisition sensor 302 and uses this information to compute a gimbal rate command $\omega_{Cmd}$ 522.

The controller 504 comprises an acquisition controller 508, estimator 514, a tracking controller 510, and a mode switch 512, all of which are communicatively coupled to the acquisition sensor 302 and the gimbal assembly 108.

The acquisition controller 508 computes the acquisition phase gimbal rate command $\omega_{cmd\_Acq}$ 530 from the measured LOS angle error $\Delta\theta_{LOS}$ 520.

The estimator 514 computes the estimated LOS angle rate $\hat{\omega}_{LOS}$ using the measured LOS angle error $\Delta\theta_{LOS}$ and the acquisition phase gimbal rate command $\omega_{cmd\_Acq}$. This can be accomplished by computing data matrices P and Q (described below) using the measured LOS angle error $\Delta\theta_{LOS}$ and the acquisition phase gimbal rate command $\omega_{cmd\_Acq}$, a computation that may be performed in parallel with the acquisition controller's 508 computation of the acquisition phase gimbal angle rate command $\omega_{cmd\_Acq}$ 530.

At time T, the end of the acquisition phase, the estimated LOS angle rate $\hat{\omega}_{LOS}$ 524 is computed from the data matrices P and Q. This estimated LOS angle rate $\hat{\omega}_{LOS}$ 524 is provided to a tracking controller 510 via first switch 526, and is used to initialize tracking controller 510 at time T.

The tracking controller 510 computes the tracking phase gimbal rate command $\omega_{cmd\_Trk}$ 532 from the measured LOS angle error $\Delta\theta_{LOS}$ 520 and is initialized by the estimated LOS angle rate $\hat{\omega}_{LOS}$ 524 only once at time T. As described above, time T can occur when the measured LOS angle error $\Delta\theta_{LOS}$ is smaller than a predefined threshold N times consecutively for the first time. The tracking phase gimbal rate command $\omega_{cmd\_Trk}$ 532 and the acquisition phase gimbal rate command $\omega_{cmd\_Acq}$ 530 are selectably and alternatively provided to the gimbal assembly 108 via switch 512.

Acquisition Controller

Figure 6:
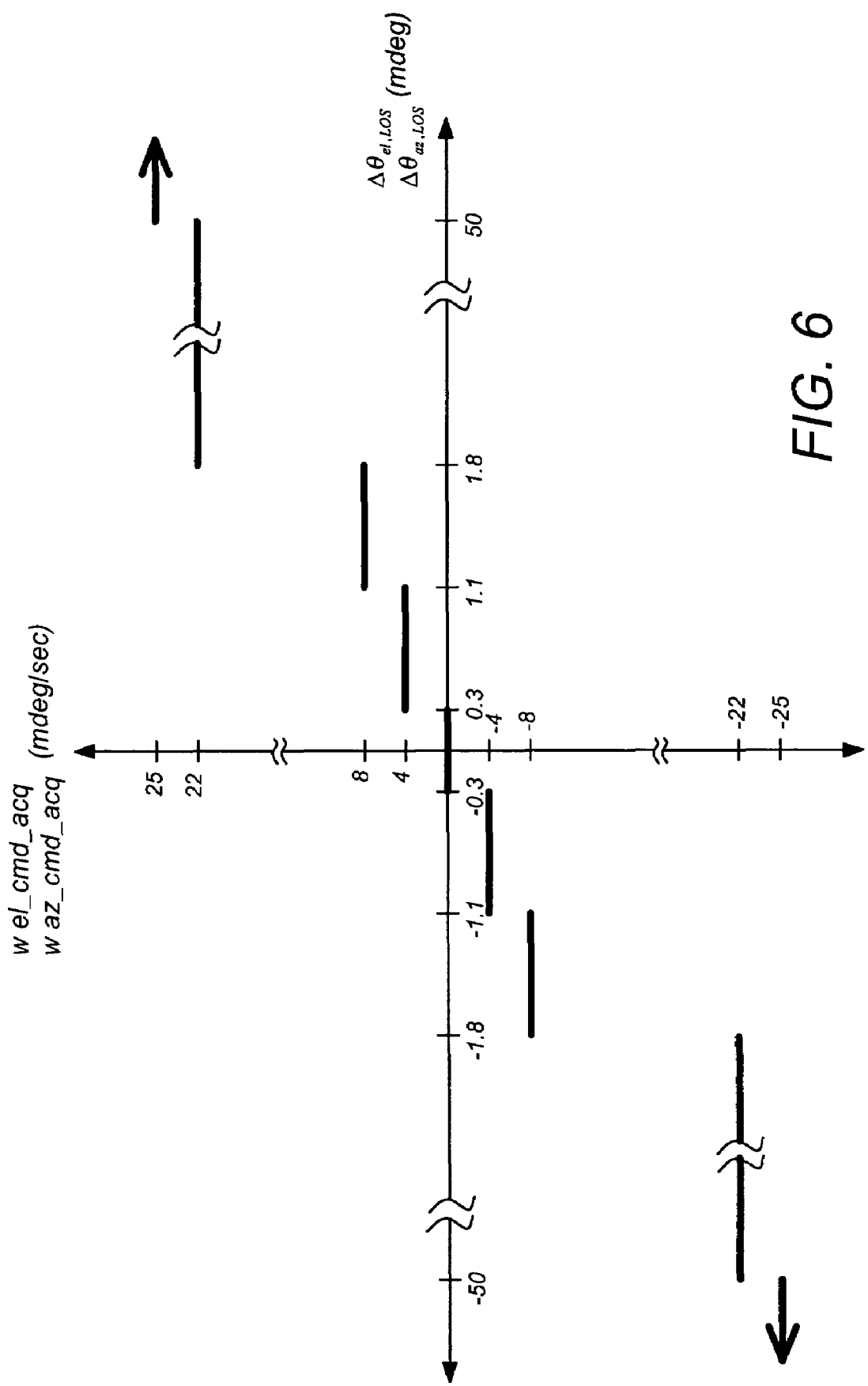
FIG. 6 is a diagram illustrating an exemplary input-output characteristic of the acquisition controller.

FIG. 6 is a diagram illustrating an exemplary input-output characteristic of the acquisition controller 508. In this embodiment, the acquisition phase gimbal rate command $\omega_{cmd\_Acq}$ is a non-linear function of the measured LOS angle error $\Delta\theta_{LOS}$ and is implemented by computing a non-linear mapping of the measured LOS angle error $\Delta\theta_{LOS}$ to the gimbal angle rate command $\omega_{cmd\_Acq}$ as shown. The piece wise continuous mapping is only one exemplary mapping of many mappings including many completely continuous mappings.

To minimize disturbances between transitions from one non-linear mapping to another, the acquisition controller optionally comprises a low pass filter 518. The low pass filter 518 low pass filters the acquisition phase gimbal rate command $\omega_{cmd\_Acq}$ 530 to smooth the command before supplying it to the gimbal assembly 108. The low pass filter 518 is typically implemented as a finite impulse response (FIR) or recursive digital filter, but may be an analog filter as well.

LOS Rate Estimator

In one embodiment, the LOS rate estimator 514 is a computational estimator based upon the following kinematic equations:

$$\Delta\theta_{el,payload,actual} - \omega_{el,LOS}\Delta t = \Delta\theta_{el,cmd} \qquad \text{Eq. 1A}$$

$$\Delta\theta_{az,payload,actual} - \omega_{az,LOS}\Delta t = \Delta\theta_{az,cmd} \qquad \text{Eq. 2B}$$

wherein:

$\Delta t = t - t_0$, and $t_0$ is an initial time;

$\Delta\theta_{el,payload,actual}$ is a change in an elevation of the LOS angle error in a platform reference frame;

$\Delta\theta_{az,payload,actual}$ is a change in an azimuth of the LOS angle error in a platform reference frame;

$\omega_{el,LOS}$ is the LOS rate in elevation;

$\omega_{az,LOS}$ is the LOS rate in azimuth;

$\Delta\theta_{el,cmd}$ is a change of a gimbal command in elevation within a time $\Delta t$; and $\Delta\theta_{az,cmd}$ is a change of a gimbal command in azimuth within a time $\Delta t$.

From these kinematic equations, the following estimation equations may be defined:

$$(K_{1el}\Delta\theta_{el,payload,sensor} + K_{2el}\Delta\theta_{az,payload,sensor} + n) - \omega_{el,LOS}\Delta t = \Delta\theta_{el,cmd} \qquad \text{Eq. 2A}$$

$$(K_{1az}\Delta\theta_{el,payload,sensor} + K_{2az}\Delta\theta_{az,payload,sensor} + n) - \omega_{az,LOS}\Delta t = \Delta\theta_{az,cmd} \qquad \text{Eq. 2B}$$

wherein $\Delta t = t - t_0$, and $t_0$ is an initial time;

$\Delta\theta_{el,payload,sensor}$ is a change in elevation of the measured LOS angle error $\Delta\theta_{LOS}$ in a platform reference frame within the time $\Delta t$;

$\Delta\theta_{az,payload,sensor}$ is a change in azimuth of the measured LOS angle error $\Delta\theta_{LOS}$ in a platform reference frame within the time $\Delta t$;

$K_{1el}$ is the elevation channel gain of the sensor responding to the elevation of the LOS angle error $K_{1az}$ is the azimuth channel cross coupling of the sensor responding to the elevation of the LOS angle error $K_{2el}$ is the elevation channel cross coupling of the sensor responding to the azimuth of the LOS angle error and $K_{2az}$ is the azimuth channel gain of the sensor responding to the azimuth of the LOS angle error Data from the acquisition sensor 302 and the gimbal assembly rate command within a time $\Delta t_i$ can be discretely sampled and used to form an observation equations for the azimuth and elevation channel as shown in equations 3A and 3B below, respectively:

$$H_{az} x_{az} = z_{az} \qquad \text{Eq. 3A}$$

$$H_{el} x_{el} = z_{el} \qquad \text{Eq. 3B}$$

wherein $$H_{az} = \begin{bmatrix} -\Delta t_1 & \Delta\theta_{el,payload,sensor,1} & \Delta\theta_{az,payload,sensor,1} \\ -\Delta t_2 & \Delta\theta_{el,payload,sensor,2} & \Delta\theta_{az,payload,sensor,2} \\ \vdots & \vdots & \vdots \end{bmatrix}, \qquad \text{Eq. 4A}$$

$$x_{az} = \begin{bmatrix} \hat{\omega}_{az,LOS} \\ \hat{K}_{1az} \\ \hat{K}_{2az} \end{bmatrix} \text{ and } z_{az} = \begin{bmatrix} \Delta\theta_{az,cmd,1} \\ \Delta\theta_{az,cmd,2} \\ \vdots \end{bmatrix}$$

$$H_{el} = \begin{bmatrix} -\Delta t_1 & \Delta\theta_{el,payload,sensor,1} & \Delta\theta_{az,payload,sensor,1} \\ -\Delta t_2 & \Delta\theta_{el,payload,sensor,2} & \Delta\theta_{az,payload,sensor,2} \\ \vdots & \vdots & \vdots \end{bmatrix}, \qquad \text{Eq. 4B}$$

$$x_{el} = \begin{bmatrix} \hat{\omega}_{el,LOS} \\ \hat{K}_{1el} \\ \hat{K}_{2el} \end{bmatrix} \text{ and } z_{el} = \begin{bmatrix} \Delta\theta_{el,cmd,1} \\ \Delta\theta_{el,cmd,2} \\ \vdots \end{bmatrix}$$

and wherein $\Delta t_i = t_i - t_0$, and $t_0$ is an initial time;

$\Delta\theta_{el,payload,sensor,i}$ is a change in an elevation of the measured LOS angle error $\Delta\theta_{LOS}$ in a platform reference frame within the time $\Delta t_i$;

$\Delta\theta_{az,payload,sensor,i}$ is a change in an azimuth of the measured LOS angle error $\Delta\theta_{LOS}$ in a platform reference frame within the time $\Delta t_i$;

$\hat{K}_{1el}$ is an estimate of the gain $K_{1el}$;

$\hat{K}_{1az}$ is an estimate of the gain $K_{1az}$;

$\hat{K}_{2el}$ is an estimate of the gain $K_{2el}$;

$\hat{K}_{2az}$ is an estimate of the gain $K_{2az}$.

Solving equations 3A and 3B results in a vector providing an estimate of the LOS rate $\hat{\omega}_{LOS}$ 524, including both the azimuth and elevation channel components $\hat{\omega}_{az,LOS}$ and $\hat{\omega}_{el,LOS}$, respectively. In one embodiment, this is accomplished using a least squares method which computes four data matrices (matrices P and Q in the azimuth and elevation channels) as described in equations 5A and 5B below $$P_{az} = (H_{az}^T H_{az}), \ Q_{az} = (H_{az}^T z_{az})$$
$$P_{el} = (H_{el}^T H_{el}), \ Q_{el} = (H_{el}^T z_{el})$$

$$\begin{bmatrix} \hat{\omega}_{az,LOS} \\ \hat{K}_{1,az} \\ \hat{K}_{2,az} \end{bmatrix} = P_{az}^{-1} Q_{az} \qquad \text{Eq. 5A}$$

$$\begin{bmatrix} \hat{\omega}_{el,LOS} \\ \hat{K}_{1,el} \\ \hat{K}_{2,el} \end{bmatrix} = P_{el}^{-1} Q_{el} \qquad \text{Eq. 5B}$$

The data matrices of $P_{el}, Q_{el}, P_{az}, Q_{az}$ are generated and updated in acquisition period and the estimation computations Eq 5A and Eq 5B are only performed once at time T the end of the acquisition period when the measured LOS angle error $\Delta\theta_{LOS}$ is smaller than a predefined threshold several times consecutively for the first time.

Tracking Controller

After the target 306 is acquired, it is thereafter tracked by the tracking controller 510. The tracking controller 510 controls the gimbal assembly 108 and platform 114 by commanding the platform 114 according to an angle rate command $\omega_{Cmd}$ after the initial (acquisition phase) control period T. At time T, the transition between the acquisition phase and the tracking phase, the tracking controller 510 is initialized to be at a steady state condition using the LOS rate estimate $\hat{\omega}_{LOS}$ derived by the LOS rate estimator 514.

Figure 7A:
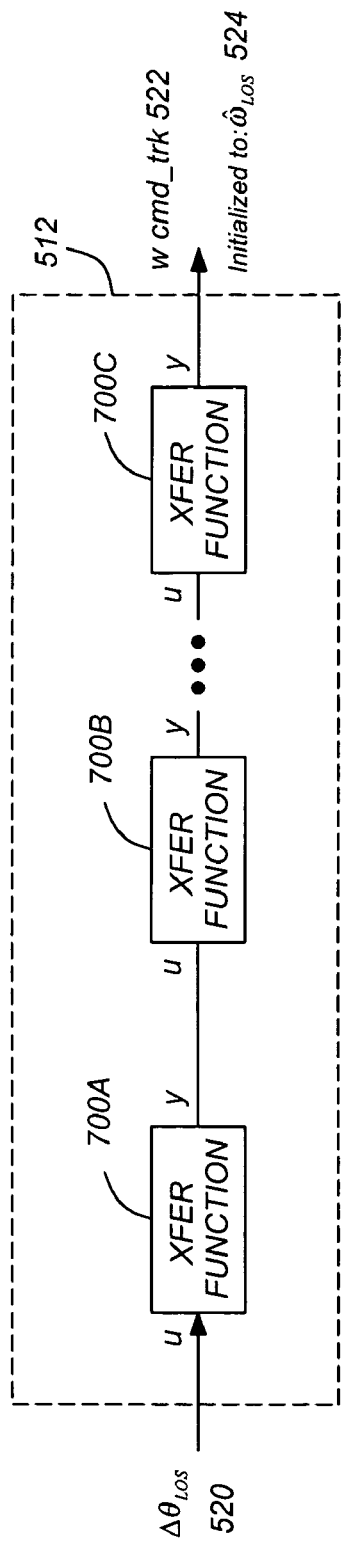
FIG. 7A is a diagram illustrating an exemplary embodiment of a tracking controller.

FIG. 7A is one embodiment of a tracking controller 510. In this embodiment, the tracking controller 510 comprises a linear controller 512 which includes a plurality (for example, a series connection) one or more of $n^{th}$ order transfer functions 700A-700C (hereinafter referred to as transfer function(s) 700). The output y of the last transfer function 700C is the tracking phase gimbal rate command $\omega_{cmd\_Trk}$ 532. This output is initialized to the estimated LOS angle rate $\hat{\omega}_{LOS}$ 524, and the states remaining transfer functions 700A and 700C are also set accordingly, as described below.

Figure 7B:
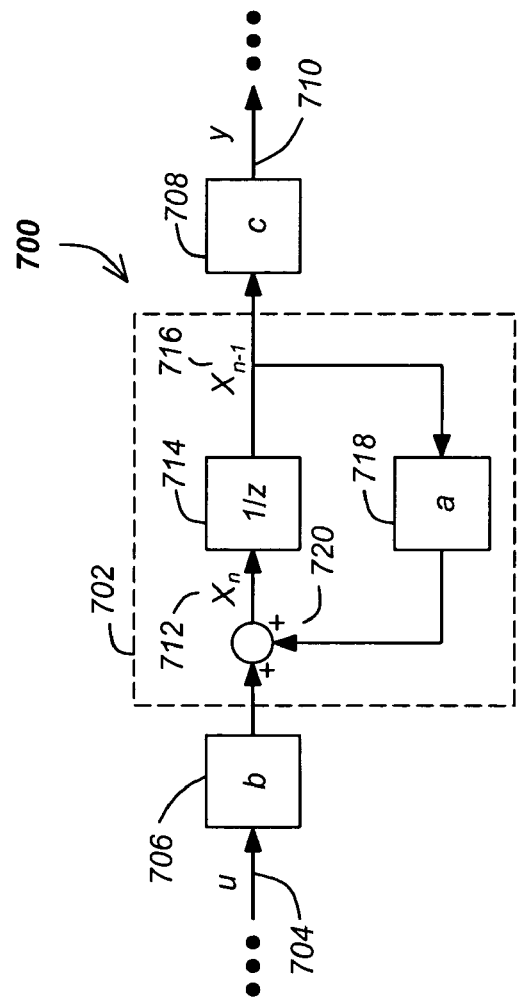
FIG. 7B is a diagram of one embodiment of an $n^{th}$ order transfer function implemented by a digital filter.

FIG. 7B is a diagram of one embodiment an $n^{th}$ order transfer function 700. In this embodiment, the $n^{th}$ order transfer function 700 includes a first order recursive digital filter 702 that accepts an input signal u 704 scaled by input gain element 706 by input gain b, and produces an output signal y 710 which has been scaled by output gain element 708 by output gain c. The digital filter 702 comprises a delay element 714 (represented in the Z-transform domain as $z^{-1}$ or $1/z$, which delays the input signal state $X_n$ 712 by one interval. The output of the delay element 714 is output signal state $X_{n-1}$ 716, which is provided to the output gain element 708. The output of the delay element $X_{n-1}$ 716 is also provided to a feedback gain element 718. The feedback gain element 718 multiples the output of the delay element $X_{n-1}$ 716 by a, and provides the result to a summer 720, which sums this input and the signal from the gain element 706 and provides the result to the input of the delay element 714.

To initialize the tracking controller 510, all of the transfer functions which comprise the tracking controller 510 must be properly initialized. For example, to initialize the first order recursive digital filter 702 shown in FIG. 7B, the output state $X_{n-1}$ 716 is set to the input state $X_n$ 712, which is set to the quotient y/c. In other words, $$X_{n-1} = X_n = y/c \qquad \text{Eq. 6}$$

wherein y is the output of the digital filter 702. If the digital filter 702 is the last of the series connected transfer functions (e.g. transfer function 700C), y is the LOS rate estimate $\hat{\omega}_{LOS}$ 524 of the appropriate channel (e.g. azimuth or elevation). The steady state input u required to produce the steady state output can be computed from the relation $$u = \frac{(1-a)}{bc} y \qquad \text{Eq. 7}$$

and can be used to initialize the output y of the previous series connected transfer function (e.g. 700B). This process is completed until all of the transfer functions 700 are appropriately initialized.

Figure 8:
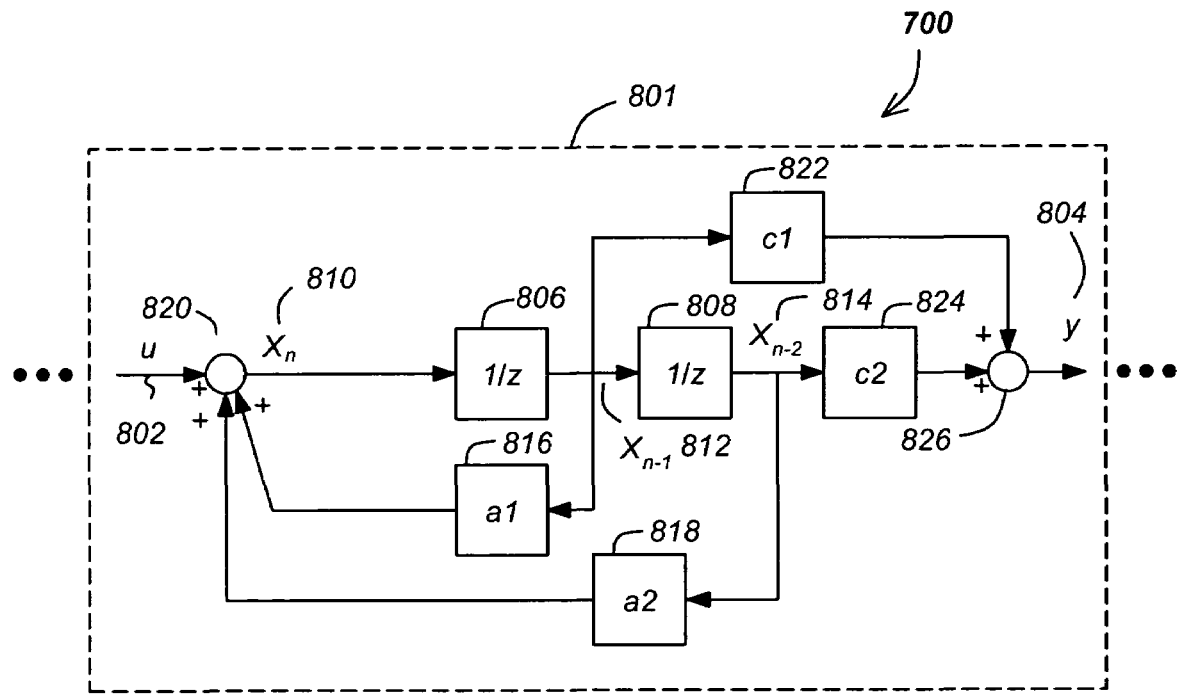
FIG. 8 is a diagram presenting another embodiment of the one or more transfer functions that together comprise the tracking controller.

FIG. 8 is a diagram of another embodiment of one or more of the transfer functions 700. In this embodiment, the transfer function 700 comprises a second order digital filter 801. The digital filter 801 accepts an input signal u 802 and produces an output signal y 804. The digital filter 801 includes a second order digital recursive filter comprising a first delay element 806 series coupled to a second delay element 808. The input to the first delay element 806 is state $X_n$ 810 and the output of the first delay element 806 is state $X_{n-1}$ 812. The output of the first delay element 806, $X_{n-1}$ 812, is provided as an input to the second delay element 812, and the output of the second delay element 808 is state $X_{n-2}$ 814. State $X_{n-1}$ 812 is provided to feedback gain element 816, where it is multiplied by a factor a1 and thereafter provided to summer 820. Similarly, state $X_{n-2}$ 814 is provided to a second feedback gain element 818, where it is multiplied by a factor a2 and thereafter provided to the summer 820. The summer 820 sums the input u and the feedback signals from feedback gain elements 816 and 818, and provides the result to delay element 806 as state $X_n$ 810. The linear controller 800 also comprises feed-forward compensation, implemented by a feed forward loop. Using feed-forward gain element 822, the feed-forward loop multiplies state $X_{n-1}$ 812, obtained between the first delay element 806 and the second delay element 808 by a value c1 and provides the result to a second summer 826. State $X_{n-2}$ 814 is provided to gain element 824, where it is multiplied by a factor c2 and provided to the second summer 826 as well. The second summer 826 sums the output of gain elements 822 and 824 (e.g. $(c1 \times X_{n-1}) + (c2 \times X_{n-2})$) to produce the output signal y 804.

The second order linear controller 800 shown in FIG. 8 can be initialized by setting $$X_{n-2} = X_{n-1} = X_n = \frac{y}{(c1+c2)} \qquad \text{Eq. 8}$$

wherein y is the output of the digital filter 801. If the digital filter 801 is the last of the series connected transfer functions (e.g. transfer function 700C), y is the LOS rate estimate $\hat{\omega}_{LOS}$ 524 of the appropriate channel (e.g. azimuth or elevation). The steady state input u required to produce the steady state output can be computed from the relation $$u = \frac{(1-a1-a2)}{(c1+c2)} y \qquad \text{Eq. 9}$$

and can be used to initialize the output y of the previous series connected transfer function (e.g. 700B). This process is completed until all of the transfer functions 700 are appropriately initialized.

Figure 9:
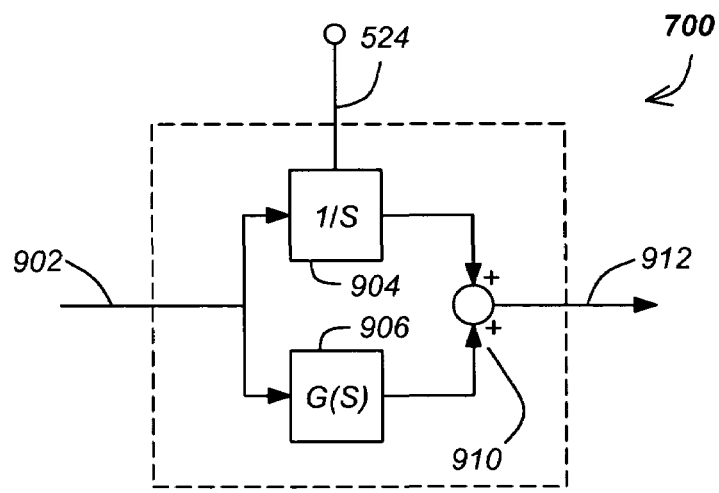
FIG. 9 is a diagram presenting another embodiment of the tracking controller.

FIG. 9 is a diagram illustrating another embodiment of a tracking controller 510. In this expression, the tracking controller 510 includes a linear controller 900. The linear controller 900 is an analog system comprising a parallel combination of an integrator 904 (represented in Laplace domain as $$\frac{1}{s}$$

and a general analog system 906 (represented in Laplace domain as G(s)). The general analog system 906 is an $n^{th}$ order system (it has n states).

The input 902 of the linear controller 900 is provided to both the integrator 904 and the general analog system 906. The output of the integrator 904 and the general analog system 906 are summed by summer 910 and provided as the output 912 of the linear controller 900. This output represents tracking phase gimbal rate command $\omega_{cmd\_Trk}$ 532 described above.

To initialize the tracking controller 510 for the transition from the acquisition mode to the tracking mode, the integrator 904 is initialized using a value representing the estimated LOS angle rate $\hat{\omega}_{LOS}$ 524, and each of the states of the general analog system G(s) are initialized to zero.

Switching Logic

When $\Delta\theta_{LOS}$ is smaller than $\Delta\theta_{threshold}$, a predefined threshold for N times consecutively for the first time, where N is also a predefined number, the LOS rate estimate $\hat{\omega}_{LOS}$ will be computed from P and Q matrices, the tracking controller will be initialized by the estimated rate $\hat{\omega}_{LOS}$, the gimbals rate command will be switched to the output of tracking controller $\omega_{cmd\_Trk}$, and the gimbals control starts its tracking control period.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. For example, the foregoing processes can be performed by hardware modules or by processors responding to software instructions stored in memory. Processing can also be shared among processors, including special purpose processors, if desired.

It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of controlling a gimbaled platform, comprising the steps of:

computing an acquisition phase gimbal angle rate command $\omega_{cmd\_Acq}$ from a measured LOS angle error $\Delta\theta_{LOS}$ for an initial control period T;

computing an estimated LOS angle rate $\hat{\omega}_{LOS}$ at least in part from the acquisition gimbal rate command $\omega_{cmd\_Acq}$;

computing a tracking phase gimbal angle rate command $\omega_{cmd\_Trk}$ using a controller initialized with the estimated LOS angle rate $\hat{\omega}_{LOS}$; and commanding the gimballed platform according to an angle rate command $\omega_{cmd}$, wherein the angle rate command $\omega_{cmd}$ is the acquisition phase angle rate command $\omega_{cmd\_Acq}$ during the initial control period T and the tracking phase gimbal angle rate command $\omega_{cmd\_Trk}$ after the initial control period T.

2. The method of claim 1, wherein the initial control period T ends when the measured LOS angle error $\Delta\theta_{LOS}$ is below a threshold value for a number N of consecutive LOS angle error $\Delta\theta_{LOS}$ measurements.

3. The method of claim 1, wherein the estimated LOS angle rate $\hat{\omega}_{LOS}$ is computed after the control period T ends.

4. The method of claim 1, wherein the estimated LOS angle rate $\hat{\omega}_{LOS}$ is computed after the control period ends from data matrices populated during the initial control period.

5. The method of claim 1, wherein the acquisition phase gimbal rate command $\omega_{cmd\_Acq}$ is computed as a non-linear mapping of the measured LOS angle error $\Delta\theta_{LOS}$ to the gimbal angle rate command $\omega_{cmd}$.

6. The method of claim 1, wherein the estimated LOS angle rate $\hat{\omega}_{LOS}$ includes an estimated azimuth LOS angle rate $\hat{\omega}_{az,LOS}$ and an estimated elevation LOS angle rate $\hat{\omega}_{el,LOS}$ is estimated according to:

$$\begin{bmatrix} \hat{\omega}_{az,LOS} \\ \hat{K}_{1,az} \\ \hat{K}_{2,az} \end{bmatrix} = (P_{az})^{-1}(Q_{az}), \quad \text{wherein:}$$

$P_{az} = (H_{az}^T H_{az})$, $Q_{az} = (H_{az}^T z_{az})$ and wherein $$H_{az} = \begin{bmatrix} -\Delta t_1 & \Delta\theta_{el,payload,sensor,1} & \Delta\theta_{az,payload,sensor,1} \\ -\Delta t_2 & \Delta\theta_{el,payload,sensor,2} & \Delta\theta_{az,payload,sensor,2} \\ \vdots & \vdots & \vdots \end{bmatrix},$$

$$\text{and } z_{az} = \begin{bmatrix} \Delta\theta_{az,cmd,1} \\ \Delta\theta_{az,cmd,2} \\ \vdots \end{bmatrix},$$

$\Delta t_i = t_i - t_0$, and $t_0$ is an initial time;

$\Delta\theta_{el,payload,sensor,i}$ is a change in elevation of the measured LOS angle error $\Delta\theta_{LOS}$ in a platform reference frame within the time $\Delta t_i$;

$\Delta\theta_{az,payload,sensor,i}$ is a change in azimuth of the measured LOS angle error $\Delta\theta_{LOS}$ in a platform reference frame within the time $\Delta t_i$;

$\hat{K}_{1az}$ is an estimate of a cross coupling of an azimuth channel of a sensor used to measure the elevation of the LOS angle error $\Delta\theta_{LOS}$; and $\hat{K}_{2az}$ is an estimate of a gain of an azimuth channel of the sensor used to measure the azimuth of the LOS angle error $\Delta\theta_{LOS}$; and $$\begin{bmatrix} \hat{\omega}_{el,LOS} \\ \hat{K}_{1,el} \\ \hat{K}_{2,el} \end{bmatrix} = (P_{el})^{-1}(Q_{el}), \quad \text{wherein:}$$

$P_{el} = (H_{el}^T H_{el})$, $Q_{el} = (H_{el}^T z_{el})$ and wherein $$H_{el} = \begin{bmatrix} -\Delta t_1 & \Delta\theta_{el,payload,sensor,1} & \Delta\theta_{az,payload,sensor,1} \\ -\Delta t_2 & \Delta\theta_{el,payload,sensor,2} & \Delta\theta_{az,payload,sensor,2} \\ \vdots & \vdots & \vdots \end{bmatrix},$$

$$\text{and } z_{el} = \begin{bmatrix} \Delta\theta_{el,cmd,1} \\ \Delta\theta_{el,cmd,2} \\ \vdots \end{bmatrix},$$

$\Delta t_i = t_i - t_0$, and $t_0$ is an initial time;

$\Delta\theta_{el,payload,sensor,i}$ is a change in an elevation of the measured LOS angle error $\Delta\theta_{LOS}$ in a platform reference frame within the time $\Delta t_i$;

$\Delta\theta_{az,payload,sensor,i}$ is a change in an azimuth of the measured LOS angle error $\Delta\theta_{LOS}$ in a platform reference frame within the time $\Delta t_i$;

$\hat{K}_{1el}$ is an estimate of a gain of an elevation channel of a sensor used to measure the elevation of the LOS angle error $\Delta\theta_{LOS}$; and $\hat{K}_{2el}$ is an estimate of a gain of an elevation channel of the sensor used to measure the azimuth of the LOS angle error $\Delta\theta_{LOS}$.

7. The method of claim 1, further comprising the step of low pass filtering the acquisition phase angle rate command $\omega_{cmd\_Acq}$ before commanding the gimballed platform.

8. The method of claim 1, wherein the measured LOS angle error $\Delta\theta_{LOS}$ is measured by an acquisition sensor.

9. The method of claim 1, wherein the tracking phase gimbal angle rate command is computed by a linear controller.

10. The method of claim 9, wherein the linear controller comprises a digital filter the output of which is initialized to the estimated LOS angle rate $\hat{\omega}_{LOS}$.

11. The method of claim 1, wherein an estimated cross coupling is computed when the estimated LOS angle rate $\hat{\omega}_{LOS}$ is computed and is used to initialize the controller.

12. The method of claim 1, wherein the initial control period T is predetermined.

13. The method of claim 1, wherein:

the gimbaled platform is controlled to acquire and track a target;

the first phase is an acquisition phase; and the second phase is a tracking phase.

14. The method of claim 1, wherein the LOS angle error $\Delta\theta_{LOS}$ is an angle between a target and a boresight of the gimbaled platform.

15. An apparatus for controlling a gimbaled platform, comprising:

means for computing an acquisition phase gimbal angle rate command $\omega_{cmd\_Acq}$ from a measured LOS angle error $\Delta\theta_{LOS}$ for an initial control period T;

means for computing an estimated LOS angle rate $\hat{\omega}_{LOS}$ at least in part from the acquisition gimbal rate command $\omega_{cmd\_Acq}$;

means for computing a tracking phase gimbal angle rate command $\omega_{cmd\_Trk}$ using a controller initialized with the estimated LOS angle rate $\hat{\omega}_{LOS}$; and means for commanding the gimballed platform according to an angle rate command $\omega_{cmd}$, wherein the angle rate command $\omega_{cmd}$ is the acquisition phase angle rate command $\omega_{cmd\_Acq}$ during the initial control period T and the tracking phase gimbal angle rate command $\omega_{cmd\_Trk}$ after the initial control period T.

16. The apparatus of claim 15, wherein the initial control period T ends when the measured LOS angle error $\Delta\theta_{LOS}$ is below a threshold value for a number N of consecutive LOS angle error $\Delta\theta_{LOS}$ measurements.

17. The apparatus of claim 15, wherein the estimated LOS angle rate $\hat{\omega}_{LOS}$ is computed after the initial control period T ends.

18. The apparatus of claim 15, wherein the estimated LOS angle rate $\hat{\omega}_{LOS}$ is computed after the initial control period ends from data matrices populated during the initial control period.

19. The apparatus of claim 15, wherein the acquisition phase gimbal rate command $\omega_{cmd\_Acq}$ is computed as a non-linear mapping of the measured LOS angle error $\Delta\theta_{LOS}$ to the gimbal angle rate command $\omega_{cmd}$.

20. The apparatus of claim 15, wherein the estimated LOS angle rate $\hat{\omega}_{LOS}$ includes an estimated elevation LOS angle rate $\hat{\omega}_{az,LOS}$ and an estimated azimuth LOS angle rate $\hat{\omega}_{el,LOS}$ is estimated according to:

$$\begin{bmatrix} \hat{\omega}_{az,LOS} \\ \hat{K}_{1,az} \\ \hat{K}_{2,az} \end{bmatrix} = (P_{az})^{-1}(Q_{az}), \text{ wherein:}$$

$P_{az} = (H_{az}^T H_{az})$, $Q_{az} = (H_{az}^T z_{az})$ and wherein $$H_{az} = \begin{bmatrix} -\Delta t_1 & \Delta\theta_{el,payload,sensor,1} & \Delta\theta_{az,payload,sensor,1} \\ -\Delta t_2 & \Delta\theta_{el,payload,sensor,2} & \Delta\theta_{az,payload,sensor,2} \\ \vdots & \vdots & \vdots \end{bmatrix},$$

$$\text{and } z_{az} = \begin{bmatrix} \Delta\theta_{az,cmd,1} \\ \Delta\theta_{az,cmd,2} \\ \vdots \end{bmatrix},$$

$\Delta t_i = t_i - t_0$, and $t_0$ is an initial time;

$\Delta\theta_{el,payload,sensor,i}$ is a change in an elevation of the measured LOS angle error $\Delta\theta_{LOS}$ in a platform reference frame within the time $\Delta t_i$;

$\Delta\theta_{az,payload,sensor,i}$ is a change in an azimuth of the measured LOS angle error $\Delta\theta_{LOS}$ in a platform reference frame within the time $\Delta t_i$;

$\hat{K}_{1az}$ is an estimate of a cross coupling of an azimuth channel of a sensor used to measure the elevation of the LOS angle error $\Delta\theta_{LOS}$; and $\hat{K}_{2az}$ is an estimate of a gain of an azimuth channel of the sensor used to measure the azimuth of the LOS angle error $\Delta\theta_{LOS}$; and $$\begin{bmatrix} \hat{\omega}_{el,LOS} \\ \hat{K}_{1,el} \\ \hat{K}_{2,el} \end{bmatrix} = (P_{el})^{-1}(Q_{el}), \text{ wherein:}$$

$P_{el} = (H_{el}^T H_{el})$, $Q_{el} = (H_{el}^T z_{el})$ and wherein $$H_{el} = \begin{bmatrix} -\Delta t_1 & \Delta\theta_{el,payload,sensor,1} & \Delta\theta_{az,payload,sensor,1} \\ -\Delta t_2 & \Delta\theta_{el,payload,sensor,2} & \Delta\theta_{az,payload,sensor,2} \\ \vdots & \vdots & \vdots \end{bmatrix},$$

$$\text{and } z_{el} = \begin{bmatrix} \Delta\theta_{el,cmd,1} \\ \Delta\theta_{el,cmd,2} \\ \vdots \end{bmatrix},$$

$\Delta t_i = t_i - t_0$, and $t_0$ is an initial time;

$\Delta\theta_{el,payload,sensor,i}$ is a change in an elevation of the measured LOS angle error $\Delta\theta_{LOS}$ in a platform reference frame within the time $\Delta t_i$;

$\Delta\theta_{az,payload,sensor,i}$ is a change in an azimuth of the measured LOS angle error $\Delta\theta_{LOS}$ in a platform reference frame within the time $\Delta t_i$;

$\hat{K}_{1el}$ is an estimate of a gain of an elevation channel of a sensor used to measure the elevation of the LOS angle error $\Delta\theta_{LOS}$; and $\hat{K}_{2el}$ is an estimate of a cross coupling of an elevation channel of the sensor used to measure the azimuth of the LOS angle error $\Delta\theta_{LOS}$.

21. The apparatus of claim 15, further comprising the step of low pass filtering the acquisition phase angle rate command $\omega_{cmd\_Acq}$ before commanding the gimballed platform.

22. The apparatus of claim 15, wherein the measured LOS angle error $\Delta\theta_{LOS}$ is measured by an acquisition sensor.

23. The apparatus of claim 15, wherein the tracking phase gimbal angle rate command $\omega_{cmd\_Trk}$ is computed by a linear controller.

24. The apparatus of claim 23, wherein the linear controller comprises a digital filter having a delay element including an output initialized to the estimated LOS angle rate $\hat{\omega}_{LOS}$.

25. The apparatus of claim 15, wherein an estimated cross coupling is computed during the initial control period and used to initialize the controller.

26. The apparatus of claim 15, wherein the initial control period T is predetermined.

27. The apparatus of claim 15, wherein:
the gimbaled platform is controlled to acquire and track a target;
the first phase is an acquisition phase; and
the second phase is a tracking phase.

28. The apparatus of claim 15, wherein the LOS angle error $\Delta\theta_{LOS}$ is an angle between a target and a boresight of the gimbaled platform.

29. A method of controlling a gimbaled platform, comprising the steps of:
computing an acquisition phase gimbal angle rate command $\omega_{cmd\_Acq}$ from a measured LOS angle error $\Delta\theta_{LOS}$ for an initial control period T;
computing an estimated LOS angle rate $\hat{\omega}_{LOS}$;
computing a tracking phase gimbal angle rate command $\omega_{cmd\_Trk}$ using a linear controller initialized with the estimated LOS angle rate $\hat{\omega}_{LOS}$ wherein the linear controller comprises a digital filter the output of which is initialized to the estimated LOS angle rate $\hat{\omega}_{LOS}$; and
commanding the gimballed platform according to an angle rate command $\omega_{cmd}$, wherein the angle rate command $\omega_{cmd}$ is the acquisition phase angle rate command $\omega_{cmd\_Acq}$ during the initial control period T and the tracking phase gimbal angle rate command $\omega_{cmd\_Trk}$ after the initial control period T.

30. The method of claim 29, wherein the initial control period T ends when the measured LOS angle error $\Delta\theta_{LOS}$ is below a threshold value for a number N of consecutive LOS angle error $\Delta\theta_{LOS}$ measurements.

31. The method of claim 29, wherein the estimated LOS angle rate $\hat{\omega}_{LOS}$ is computed after the control period T ends.

32. The method of claim 29, wherein the estimated LOS angle rate $\hat{\omega}_{LOS}$ is computed after the control period ends from data matrices populated during the initial control period.

33. The method of claim 29, wherein the acquisition phase gimbal rate command $\omega_{cmd\_Acq}$ is computed as a non-linear mapping of the measured LOS angle error $\Delta\theta_{LOS}$ to the gimbal angle rate command $\omega_{cmd}$.

34. The method of claim 29, wherein the estimated LOS angle rate $\hat{\omega}_{LOS}$ is estimated at least in part from the angle rate command.

35. The method of claim 34, wherein the estimated LOS angle rate $\hat{\omega}_{LOS}$ includes an estimated azimuth LOS angle rate $\hat{\omega}_{az,LOS}$ and an estimated elevation LOS angle rate $\hat{\omega}_{el,LOS}$ is estimated according to:

$$\begin{bmatrix} \hat{\omega}_{az,LOS} \\ \hat{K}_{1,az} \\ \hat{K}_{2,az} \end{bmatrix} = (P_{az})^{-1}(Q_{az}) \text{ wherein:}$$

$P_{az} = (H_{az}^T H_{az})$, $Q_{az} = (H_{az}^T z_{az})$ and wherein $$H_{az} = \begin{bmatrix} -\Delta t_1 & \Delta\theta_{el,payload,sensor,1} & \Delta\theta_{az,payload,sensor,1} \\ -\Delta t_2 & \Delta\theta_{el,payloadsensor,2} & \Delta\theta_{az,payload,sensor,2} \\ \vdots & \vdots & \vdots \end{bmatrix},$$

$$\text{and } z_{az} = \begin{bmatrix} \Delta\theta_{az,cmd,1} \\ \Delta\theta_{az,cmd,2} \\ \vdots \end{bmatrix},$$

$\Delta t_i = t_i - t_0$, and $t_0$ is an initial time;

$\Delta\theta_{el,payload,sensor,i}$ is a change in an elevation of the measured LOS angle error $\Delta\theta_{LOS}$ in a platform reference frame within the time $\Delta t_i$;

$\Delta\theta_{az,payload,sensor,i}$ is a change in an azimuth of the measured LOS angle error $\Delta\theta_{LOS}$ in a platform reference frame within the time $\Delta t_i$;

$\hat{K}_{1az}$ is an estimate of a gain of an elevation channel of a sensor used to measure the elevation of the LOS angle error $\Delta\theta_{LOS}$; and $\hat{K}_{2az}$ is an estimate of a gain of an elevation channel of the sensor used to measure the azimuth of the LOS angle error $\Delta\theta_{LOS}$. and $$\begin{bmatrix} \hat{\omega}_{el,LOS} \\ \hat{K}_{1,el} \\ \hat{K}_{2,el} \end{bmatrix} = (P_{el})^{-1}(Q_{el}), \text{ wherein:}$$

$P_{el} = (H_{el}^T H_{el})$, $Q_{el} = (H_{el}^T z_{el})$ and wherein $$H_{el} = \begin{bmatrix} -\Delta t_1 & \Delta\theta_{el,payload,sensor,1} & \Delta\theta_{az,payload,sensor,1} \\ -\Delta t_2 & \Delta\theta_{el,payloadsensor,2} & \Delta\theta_{az,payload,sensor,2} \\ \vdots & \vdots & \vdots \end{bmatrix},$$

$$\text{and } z_{el} = \begin{bmatrix} \Delta\theta_{el,cmd,1} \\ \Delta\theta_{el,cmd,2} \\ \vdots \end{bmatrix},$$

$\Delta t_i = t_i - t_0$, and $t_0$ is an initial time;

$\Delta\theta_{el,payload,sensor,i}$ is a change in an elevation of the measured LOS angle error $\Delta\theta_{LOS}$ in a platform reference frame within the time $\Delta t_i$;

$\Delta\theta_{az,payload,sensor,i}$ is a change in an azimuth of the measured LOS angle error $\Delta\theta_{LOS}$ in a platform reference frame within the time $\Delta t_i$;

$\hat{K}_{1el}$ is an estimate of a gain of an elevation channel of a sensor used to measure the elevation of the LOS angle error $\Delta\theta_{LOS}$; and $\hat{K}_{2el}$ is an estimate of a gain of an elevation channel of the sensor used to measure the azimuth of the LOS angle error $\Delta\theta_{LOS}$.

36. The method of claim 29, further comprising the step of low pass filtering the acquisition phase angle rate command $\omega_{cmd\_Acq}$ before commanding the gimballed platform.

37. The method of claim 29, wherein the measured LOS angle error $\Delta\theta_{LOS}$ is measured by an acquisition sensor.

38. The method of claim 29, wherein an estimated cross coupling is computed when the estimated LOS angle rate $\hat{\omega}_{LOS}$ is computed and is used to initialize the controller.

39. The method of claim 29, wherein the initial control period T is predetermined.

40. The method of claim 29, wherein:
the gimbaled platform is controlled to acquire and track a target;
the first phase is an acquisition phase; and
the second phase is a tracking phase.

41. The method of claim 29, wherein the LOS angle error $\Delta\theta_{LOS}$ is an angle between a target and a boresight of the gimbaled platform.

42. An apparatus for controlling a gimbaled platform, comprising:
means for computing an acquisition phase gimbal angle rate command $\omega_{cmd\_Acq}$ from a measured LOS angle error $\Delta\theta_{LOS}$ for an initial control period T;
means for computing an estimated LOS angle rate $\hat{\omega}_{LOS}$;
means for computing a tracking phase gimbal angle rate command $\hat{\omega}_{cmd\_Trk}$ using a linear controller initialized with the estimated LOS angle rate $\hat{\omega}_{LOS}$ wherein the linear controller comprises a digital filter the output of which is initialized to the estimated LOS angle rate $\hat{\omega}_{LOS}$; and
means for commanding the gimballed platform according to an angle rate command $\omega_{cmd}$, wherein the angle rate command $\omega_{cmd}$ is the acquisition phase angle rate command $\hat{\omega}_{cmd\_Acq}$ during the initial control period T and the tracking phase gimbal angle rate command $\hat{\omega}_{cmd\_Trk}$ after the initial control period T.

43. The apparatus of claim 42, wherein the initial control period T ends when the measured LOS angle error $\Delta\theta_{LOS}$ is below a threshold value for a number N of consecutive LOS angle error $\Delta\theta_{LOS}$ measurements.

44. The apparatus of claim 42, wherein the estimated LOS angle rate $\hat{\omega}_{LOS}$ is computed after the initial control period T ends.

45. The apparatus of claim 42, wherein the estimated LOS angle rate $\hat{\omega}_{LOS}$ is computed after the initial control period ends from data matrices populated during the initial control period.

46. The apparatus of claim 42, wherein the acquisition phase gimbal rate command $\omega_{cmd\_Acq}$ is computed as a non-linear mapping of the measured LOS angle error $\Delta\theta_{LOS}$ to the gimbal angle rate command $\omega_{cmd}$.

47. The apparatus of claim 42, wherein the estimated LOS angle rate $\hat{\omega}_{LOS}$ is estimated at least in part from the angle rate command.

48. The apparatus of claim 47, wherein the estimated LOS angle rate $\hat{\omega}_{LOS}$ includes an estimated azimuth LOS angle rate $\hat{\omega}_{az,LOS}$ and an estimated elevation LOS angle rate $\hat{\omega}_{el,LOS}$ is estimated according to:

$$\begin{bmatrix} \hat{\omega}_{az,LOS} \\ \hat{K}_{1,az} \\ \hat{K}_{2,az} \end{bmatrix} = (P_{az})^{-1}(Q_{az}), \text{ wherein:}$$

$P_{az} = (H_{az}^T H_{az})$, $Q_{az} = (H_{az}^T z_{az})$ and wherein $$H_{az} = \begin{bmatrix} -\Delta t_1 & \Delta\theta_{el,payload,sensor,1} & \Delta\theta_{az,payload,sensor,1} \\ -\Delta t_2 & \Delta\theta_{el,payload,sensor,2} & \Delta\theta_{az,payload,sensor,2} \\ \vdots & \vdots & \vdots \end{bmatrix},$$

and $z_{az} = \begin{bmatrix} \Delta\theta_{az,cmd,1} \\ \Delta\theta_{az,cmd,2} \\ \vdots \end{bmatrix}$, $\Delta t_i = t_i - t_0$, and $t_0$ is an initial time;

$\Delta\theta_{el,payload,sensor,i}$ is a change in an elevation of the measured LOS angle error $\Delta\theta_{LOS}$ in a platform reference frame within the time $\Delta t_i$;

$\Delta\theta_{az,payload,sensor,i}$ is a change in an azimuth of the measured LOS angle error $\Delta\theta_{LOS}$ in a platform reference frame within the time $\Delta t_i$;

$\hat{K}_{1az}$ is an estimate of a cross coupling of an azimuth channel of a sensor used to measure the elevation of the LOS angle error $\Delta\theta_{LOS}$; and $\hat{K}_{2az}$ is an estimate of a gain of an azimuth channel of the sensor used to measure the azimuth of the LOS angle error $\Delta\theta_{LOS}$; and $$\begin{bmatrix} \hat{\omega}_{el,LOS} \\ \hat{K}_{1,el} \\ \hat{K}_{2,el} \end{bmatrix} = (P_{el})^{-1}(Q_{el}), \text{ wherein:}$$

$P_{el} = (H_{el}^T H_{el})$, $Q_{el} = (H_{el}^T z_{el})$ and wherein $$H_{el} = \begin{bmatrix} -\Delta t_1 & \Delta\theta_{el,payload,sensor,1} & \Delta\theta_{az,payload,sensor,1} \\ -\Delta t_2 & \Delta\theta_{el,payload,sensor,2} & \Delta\theta_{az,payload,sensor,2} \\ \vdots & \vdots & \vdots \end{bmatrix},$$

and $z_{el} = \begin{bmatrix} \Delta\theta_{el,cmd,1} \\ \Delta\theta_{el,cmd,2} \\ \vdots \end{bmatrix}$, $\Delta t_i = t_i - t_0$, and $t_0$ is an initial time;

$\Delta\theta_{el,payload,sensor,i}$ is a change in an elevation of the measured LOS angle error $\Delta\theta_{LOS}$ in a platform reference frame within the time $\Delta t_i$;

$\Delta\theta_{az,payload,sensor,i}$ is a change in an azimuth of the measured LOS angle error $\Delta\theta_{LOS}$ in a platform reference frame within the time $\Delta t_i$;

$\hat{K}_{1el}$ is an estimate of a gain of an elevation channel of a sensor used to measure the elevation of the LOS angle error $\Delta\theta_{LOS}$; and $\hat{K}_{2el}$ is an estimate of a cross coupling of an elevation channel of the sensor used to measure the azimuth of the LOS angle error $\Delta\theta_{LOS}$.

49. The apparatus of claim 42, further comprising the step of low pass filtering the acquisition phase angle rate command $\omega_{cmd\_Acq}$ before commanding the gimballed platform.

50. The apparatus of claim 42, wherein the measured LOS angle error $\Delta\theta_{LOS}$ is measured by an acquisition sensor.

51. The apparatus of claim 42, wherein an estimated cross coupling is computed during the initial control period and used to initialize the controller.

52. The apparatus of claim 42, wherein the initial control period T is predetermined.

53. The apparatus of claim 42, wherein:
the gimbaled platform is controlled to acquire and track a target;
the first phase is an acquisition phase; and
the second phase is a tracking phase.

54. The apparatus of claim 42, wherein the LOS angle error $\Delta\theta_{LOS}$ is an angle between a target and a boresight of the gimbaled platform.

* * * * *